Patented May 22, 1928.

1,670,740

UNITED STATES PATENT OFFICE.

GEORGE W. RAIZISS AND BARRETT C. FISHER, OF PHILADELPHIA, PENNSYLVANIA, ASSIGNORS TO THE ABBOTT LABORATORIES, OF CHICAGO, ILLINOIS, A CORPORATION OF ILLINOIS.

MANUFACTURE OF ALDEHYDE COMPOUNDS OF DIAMINO-ACRIDINES AND THE NOVEL PRODUCT RESULTING THEREFROM.

No Drawing.   Application filed May 25, 1923.   Serial No. 641,521.

The method of production of di-aminoacridine has long been well known, as has also the production therefrom of 3-6-diamino-alkyl-acridinium salts. Among these salts, 3,6-diamino-10-methylacridinium chloride monohydrochloride and 3,6-diamino-10-methylacridinium chloride di-hydrochloride are well known under the trade names Acriflavine and Neutral Acriflavine respectively.

The object of the present invention is the production of a series of generically similar aldehyde addition products from diamino acridinium compounds, preferably using as starting or initial material what is commonly sold as acriflavine, 3,6-diamino-10-methyl acridinium chloride monohydrochlorids or its salts or its alkyl derivatives.

The resultant aldehyde derivatives differ from the so-called "Schiff's" bases, in that water is not split off as with Schiff's bases. These new aldehyde derivatives have marked value in therapy, in that we have found that they have superior bactericidal effects on bacilli, such as staphylococcus aureus and bacillus typhosus; the aromatic salicyl aldehyde derivatives, for instance, showing a greater utility in that regard.

The novel product resulting from our process or method of manufacture of our aromatic aldehyde compounds of diaminoacridine, is characterized by the chemical union of the two amino groups in diaminoacridinium compounds with two aldehyde molecules; and these, for example, may be salicyl-aldehyde or anisic-aldehyde, or cinnamic-aldehyde, or hydro-cinnamic aldehyde, or para-hydroxy-benzaldehyde, the position of the aldehyde group in our new compound being the same in each compound, namely an addition to each amino group of the diamino-acridine nucleus.

The novel aldehyde derivative produced is essentially an aldehydic addition product of diamino - acridine or diamino - acridinium compounds, and the process of preparing them is illustrated by the following example; and the particular diamino-acridinium compound selected to illustrate the procedure is the 3-6-diamino-10-methyl-acridinium chloride mono-hydrochloride, or the so called "acriflavine."

At least 7.85 grams or the equivalent of one mole in grams (an excess does not change the reaction) of 3-6-diamino-acridinium chloride mono-hydrochloride, whose empirical formula is $C_{14}H_{14}N_3Cl.HCl.H_2O$, and atomic weight is 314, or the equivalent weight of its salts or alkyl derivatives, is dissolved in about 1000 c. c. of water, to which is added in admixture 6.10 grams (equivalent to two molecules) of salicyl aldehyde previously dissolved in about 200 c. c. of 95% methyl alcohol and about 200 c. c. of hydrochloric acid concentrated.

The mixture is vigorously shaken for about half an hour and then allowed to stand for several hours or until crystallization results. The crystals are isolated by filtration and washed with about 10 per cent hydrochloric acid and then kept in vacuo until completely dry.

Of course the above proportions shall be changed in accordance with the molecular weights of other di-amino acridinium compounds that are used, as well as other aldehydes.

The chemical reaction which takes place is as follows:

The aldehyde group, which may be expressed by $\overset{}{\underset{H}{C}} = O$, is so changed that the oxygen which, by means of two valences, has become attached to the carbon, is changed into hydroxyl, OH. The hydroxyl utilizes only one valence of the carbon in attaching itself to it, so that one bond of the carbon is released and attaches itself to the nitrogen of the amino group, while one of the two hydrogens, previously combined to nitrogen of the amino group, separates therefrom to join the oxygen previously attached to the carbon by the double bond and is changed to hydroxyl, no water being split off. Hence the process of addition consists of the removal of one hydrogen from the amino group and placing the same hydrogen in the aldehyde group to form a hydroxyl group.

The double bond in the aldehyde disappears, and the one bond released in this way, is utilized for the combination of carbon of the aldehyde group with the nitrogen of the amino group.

This effect takes place with each amino group of the di-amino-acridinium compound that is used.

A graphic representation of it is as follows:

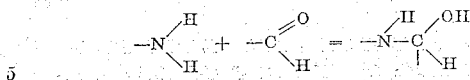

The salicyl-aldehyde derivative of diamino acridinium chloride is a substance which is crystalline in character, red in color, with a yellowish tinge when dissolved in water, and would be represented by the following structural formula:

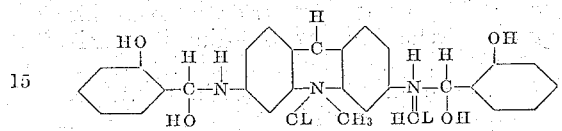

We claim—
1. An addition product in which two aromatic aldehyde molecules are united to the amino-groups of 3,6 di-amino-10-alkyl acridinium compounds.
2. A crystalline addition product in which two salicyl aldehyde molecules are chemically united to the amino groups of a 3,6 di-amino-10-akyl acridinium compound.
3. The process of producing addition products of diamino-acridines with an aldehyde without splitting off water; which comprises treating an aqueous solution of a 3,6 di-amino-10-alkyl acridinium compound with at least two equivalent molecular weights of an aromatic aldehyde dissolved in alcohol and concentrated hydrochloric acid, removing the resultant compound, washing it with weak hydrochloric acid and drying it.
4. The process of producing an addition product of diamino-acridines with an aromatic aldehyde; which comprises treating an aqueous solution of a 3,6 di-amino-10-alkyl acridinium compound with at least two equivalent molecular weights of salicyl aldehyde dissolved in a solution of an alcohol and concentrated hydrochloric acid, removing the resulting crystals, washing them with dilute hydrochloric acid and drying.
5. The process of producing an addition product of a diamino-acridine compound; which comprises treating an aqueous solution of a 3,6-diamino-10-methyl acridinium chloride mono-hydrochloride (known commercially as acriflavine) with at least two equivalent molecular weights of an aromatic aldehyde dissolved in a solution of alcohol and concentrated hydrochloric acid, removing the resultant product, washing it with dilute hydrochloric acid and drying.
6. The process of producing an addition product of a diamino-acridine compound, which comprises treating an aqueous solution of a 3,6-diamino-10-methyl acridinium chloride mono-hydrochloride (known commercially as acriflavine) with at least two equivalent molecular weights of salicyl aldehyde disssolved in a solution of alcohol and concentrated hydrochloric acid, removing the resultant product, washing with dilute hydrochloric acid and drying.

In testimony whereof, we have hereunto affixed our signatures this May A. D. 1923.

GEORGE W. RAIZISS.
BARRETT C. FISHER.